United States Patent
Moon et al.

(10) Patent No.: US 11,837,709 B2
(45) Date of Patent: Dec. 5, 2023

(54) MANUFACTURING APPARATUS OF ELECTRODE FOR SECONDARY BATTERY COMPRISING HEATING PART AND MANUFACTURING METHOD OF ELECTRODE FOR SECONDARY BATTERY COMPRISING HEATING PROCESS, FOR HEATING ELECTRODE CURRENT COLLECTOR BEFORE COATING WITH ELECTRODE ACTIVE MATERIAL SLURRY

(71) Applicant: LG Energy Solution, Ltd., Seoul (KR)

(72) Inventors: Jaewon Moon, Daejeon (KR); Hyung Seok Han, Daejeon (KR); Ki Hoon Paeng, Daejeon (KR); Sang Myeon Lee, Daejeon (KR)

(73) Assignee: LG Energy Solution, Ltd.

( * ) Notice: Subject to any disclaimer, the term of this patent is extended or adjusted under 35 U.S.C. 154(b) by 0 days.

(21) Appl. No.: 17/431,944

(22) PCT Filed: Nov. 30, 2020

(86) PCT No.: PCT/KR2020/017282
§ 371 (c)(1),
(2) Date: Aug. 18, 2021

(87) PCT Pub. No.: WO2021/118141
PCT Pub. Date: Jun. 17, 2021

(65) Prior Publication Data
US 2022/0173368 A1 Jun. 2, 2022

(30) Foreign Application Priority Data
Dec. 9, 2019 (KR) .................. 10-2019-0163112
Nov. 20, 2020 (KR) .................. 10-2020-0156456

(51) Int. Cl.
*H01M 4/04* (2006.01)
*B05C 9/14* (2006.01)
(Continued)

(52) U.S. Cl.
CPC ........ *H01M 4/0404* (2013.01); *B05D 3/0218* (2013.01); *B05C 5/0254* (2013.01); *B05C 9/14* (2013.01); *H01M 4/661* (2013.01)

(58) Field of Classification Search
None
See application file for complete search history.

(56) References Cited

U.S. PATENT DOCUMENTS 4,670,214 A * 6/1987 Magnuson .............. B22F 3/004
264/173.1
4,765,598 A * 8/1988 Magnuson ............ H01M 4/242
266/110
(Continued)

FOREIGN PATENT DOCUMENTS

CN 103022421 A 4/2013
CN 105315550 A 2/2016
(Continued)

OTHER PUBLICATIONS

Extended Search Report for Application No. 20898251.2 dated Jun. 20, 2022. 12 pgs.
(Continued)

*Primary Examiner* — Jethro M. Pence
(74) *Attorney, Agent, or Firm* — Lerner David LLP (57) ABSTRACT

The present disclosure relates to a manufacturing apparatus of an electrode for a secondary battery including a heating part and a manufacturing method of an electrode for a secondary battery including a heating process, which performs heating of an electrode current collector before coating with an electrode active material slurry.

9 Claims, 3 Drawing Sheets

(51) Int. Cl.
  *B05D 3/02* (2006.01)
  *H01M 4/66* (2006.01)
  *B05C 5/02* (2006.01)

(56) References Cited

U.S. PATENT DOCUMENTS

| | | | | |
|---|---|---|---|---|
| 4,911,995 | A * | 3/1990 | Belanger | H01M 4/0435 |
| | | | | 428/458 |
| 5,965,298 | A * | 10/1999 | Harada | B22F 3/1137 |
| | | | | 429/234 |
| 6,020,089 | A * | 2/2000 | Harada | H01M 4/667 |
| | | | | 429/234 |
| 9,136,537 | B2 | 9/2015 | Moon et al. | |
| 9,281,539 | B2 * | 3/2016 | Tsutsumi | H01M 4/505 |
| 9,368,799 | B2 * | 6/2016 | Majima | C25D 7/0614 |
| 9,620,768 | B2 * | 4/2017 | Kogetsu | H01M 4/139 |
| 9,673,453 | B2 * | 6/2017 | Uchida | H01M 4/621 |
| 9,692,057 | B2 * | 6/2017 | Majima | B32B 15/015 |
| 10,147,932 | B2 * | 12/2018 | Park | H01M 10/0525 |
| 10,217,993 | B2 * | 2/2019 | Uchida | H01M 4/1393 |
| 10,276,857 | B2 * | 4/2019 | Tsuchiya | F26B 13/10 |
| 10,283,808 | B2 * | 5/2019 | Suzuki | H01M 4/0416 |
| 10,468,664 | B2 * | 11/2019 | Sakashita | H01M 4/0435 |
| 10,483,549 | B2 | 11/2019 | Baek et al. | |
| 10,770,713 | B2 * | 9/2020 | Park | H01M 50/46 |
| 11,081,682 | B2 * | 8/2021 | Park | H01M 50/403 |
| 11,367,876 | B2 * | 6/2022 | Han | H01M 4/0404 |
| 2002/0007552 | A1 * | 1/2002 | Singleton | H01M 10/0413 |
| | | | | 29/730 |
| 2005/0236732 | A1 * | 10/2005 | Brosch | H01M 4/0404 |
| | | | | 264/210.2 |
| 2012/0214040 | A1 * | 8/2012 | Tsutsumi | H01M 4/1391 |
| | | | | 156/182 |
| 2012/0328957 | A1 | 12/2012 | Hosoe et al. | |
| 2013/0078365 | A1 | 3/2013 | Mori et al. | |
| 2015/0280226 | A1 * | 10/2015 | Teraki | H01M 10/0431 |
| | | | | 118/314 |
| 2015/0372286 | A1 * | 12/2015 | Bolandi | B05B 13/0221 |
| | | | | 427/482 |
| 2018/0241045 | A1 | 8/2018 | Baek et al. | |
| 2019/0067732 | A1 * | 2/2019 | Zhamu | C01G 39/06 |
| 2019/0081317 | A1 * | 3/2019 | Keil | B05C 9/04 |
| 2019/0218654 | A1 | 7/2019 | Wu et al. | |
| 2019/0326583 | A1 * | 10/2019 | Zhang | H01M 4/04 |
| 2021/0057774 | A1 * | 2/2021 | Paeng | B65H 26/04 |
| 2021/0151738 | A1 * | 5/2021 | Moon | H01M 4/04 |
| 2021/0193986 | A1 * | 6/2021 | Gayden | H01M 4/0402 |
| 2021/0313580 | A1 * | 10/2021 | Tanaka | H01M 10/0525 |
| 2022/0093903 | A1 * | 3/2022 | Rust | H01M 4/0469 |
| 2022/0131175 | A1 * | 4/2022 | Lee | H01M 10/0463 |
| 2022/0216455 | A1 * | 7/2022 | Paeng | H01M 4/0404 |
| 2022/0231274 | A1 * | 7/2022 | Zagars | H01M 10/058 |

FOREIGN PATENT DOCUMENTS

| | | |
|---|---|---|
| JP | H1131503 A | 2/1999 |
| JP | 2000182623 A | 6/2000 |
| JP | 2001015104 A | 1/2001 |
| JP | 2008159297 A | 7/2008 |
| KR | 19980038001 A | 8/1998 |
| KR | 20000061681 A | 10/2000 |
| KR | 100553731 B1 | 2/2006 |
| KR | 20080084016 A | 9/2008 |
| KR | 20110128591 A | 11/2011 |
| KR | 20130101174 A | 9/2013 |
| KR | 20140032897 A | 3/2014 |
| KR | 101550864 B1 | 9/2015 |
| KR | 20170088614 A | 8/2017 |
| KR | 20170109493 A | 9/2017 |
| KR | 20180090532 A | 8/2018 |

OTHER PUBLICATIONS

Search Report dated May 27, 2022 from Office Action for Chinese Application No. 202080022528.2 dated Jun. 1, 2022. 3 pgs.
International Search Report for PCT/KR2020/017282 dated Mar. 5, 2021. 2 pgs.
Wu, S. "Concise illustration Manual for Forging," Northwestern Polytechnical University Press, Jun. 2019, p. 655. [English Translation of Abstract only].

* cited by examiner

MANUFACTURING APPARATUS OF ELECTRODE FOR SECONDARY BATTERY COMPRISING HEATING PART AND MANUFACTURING METHOD OF ELECTRODE FOR SECONDARY BATTERY COMPRISING HEATING PROCESS, FOR HEATING ELECTRODE CURRENT COLLECTOR BEFORE COATING WITH ELECTRODE ACTIVE MATERIAL SLURRY

CROSS-REFERENCE TO RELATED APPLICATIONS

The present application is a national phase entry under 35 U.S.C. § 371 of International Application No. PCT/KR2020/017282, filed on Nov. 30, 2020, which claims priority to Korean Patent Application No. 10-2019-0163112, filed on Dec. 9, 2019, and Korean Patent Application No. 10-2020-0156456 filed on Nov. 20, 2020, each of which are hereby incorporated by reference in their entirety.

TECHNICAL FIELD

The present disclosure relates to a manufacturing apparatus of an electrode for secondary battery including a heating part and a manufacturing method of an electrode for secondary battery including a heating process, for heating an electrode current collector before coating with an electrode active material slurry.

Background Art

Due to the rapid increase in the use of fossil fuels, the demand for the use of alternative energy or clean energy is increasing, and as part thereof, the fields that are being studied most actively are the fields of power generation and power storage using electrochemistry.

At present, a secondary battery is a representative example of an electrochemical device that utilizes such electrochemical energy, and the range of use thereof tends to be gradually expanding.

Recently, with the increase of the technological development and demand for mobile devices such as portable computers, portable phones, and cameras, demand for secondary batteries as an energy source rapidly increases. Among such secondary batteries, many studies have been conducted on a lithium secondary battery that exhibit high energy density and operating potential, have a long cycle life and a low self-discharge rate, and are commercialized and widely used.

In addition, as interest in environmental issues grows, studies are frequently conducted on an electric vehicle, a hybrid electric vehicle, etc. which can replace a vehicle using fossil fuels such as a gasoline vehicle and a diesel vehicle, which are one of the main causes of air pollution. Although a nickel metal hydride secondary battery is mainly used as a power source for the electric vehicle and the hybrid electric vehicle, research on the use of a lithium secondary battery having high energy density and discharge voltage is actively being conducted, a part of which are in the commercialization stage.

Copper foil which is mainly used as a negative electrode current collector of such a lithium secondary battery, is stable at 0 to 2.5V, which is the operating potential range of the negative electrode, and is a component that is difficult to replace due to its price competitiveness and excellent electrical conductivity.

After the copper foil is manufactured by the manufacturer, the copper foil has an unstable phase and thus a broad error range in mechanical properties, which is stored at room temperature for a long period of time to perform self-annealing in which tensile strength is stabilized, and in this case, the heating is performed for shortening the annealing time, or for accelerated testing for final shipment.

Despite the manufacturing method almost similar to the above-mentioned method, since there are techniques that are unique to each manufacturer, the mechanical properties of the copper foils produced by various manufacturers are varied, and furthermore, variations in mechanical properties occur even within the copper foils produced by the same manufacturer.

Therefore, even in the manufacturers of secondary batteries using the copper foil, there is an urgent need to develop their own unique techniques capable of enhancing the mechanical properties of such copper foil.

DETAILED DESCRIPTION OF THE INVENTION

Technical Problem

The present disclosure has been designed to solve the above-mentioned problems, and an object of the present disclosure is to perform heating of a sheet-shaped current collector under a specific condition in the manufacturing process of a secondary battery electrode, thereby maximizing toughness and elongation while minimizing a decrease in tensile strength of the sheet-shaped current collector.

Technical Solution

It should be understood that the terms and wordings used in the specification and claims should not be construed to be limited to general or lexical means and the concepts of the terms may be defined to describe the invention made by the inventor(s) the best way, and based on such principle, the terms and wordings should be constructed to have meanings and concepts that comply with the technical spirit of the present disclosure.

Hereinafter, according to one embodiment of the present disclosure, there is provided an apparatus for manufacturing an electrode for a secondary battery including:

a roller-shaped unwinder in which a sheet-shaped current collector containing copper is wound;

a transfer part for continuously transferring the sheet-shaped current collector;

a heating part for heating the sheet-shaped current collector transferred from the unwinder at a temperature of 120° C. to 150° C. for a time (M) satisfying the following Equation 1; and a coating part for coating an electrode active material slurry onto at least one surface of the heated sheet-shaped current collector.

$$\frac{6000}{D} - 38 \leq M \leq \frac{6000}{D} - 10 \qquad \text{[Equation 1]}$$

wherein, D is a heating temperature (° C.), and
M is a heating time (minutes).

The sheet-shaped current collector may be composed of copper (Cu), or may be a material in which the surface of copper is coated with carbon, or an alloy or laminate of copper and other metals.

The heating may be performed by a convection method through hot air in the atmosphere, a heating method using a heat source, or both of these methods.

The sheet-shaped current collector may have a room-temperature tensile strength after heating which is reduced by within 5% compared to the room-temperature tensile strength before heating, and has a room-temperature tensile strength before heating of 30 kgf/mm² to 45 kgf/mm².

The sheet-shaped current collector may have an elongation after heating which is increased by 15% to 60% compared to the elongation before heating, and may have a toughness after heating which is increased by 20% to 50% compared to the toughness before heating.

Further, the electrode manufacturing apparatus may further include:

a drying part configured to form an electrode mixture on at least one surface of a sheet-shaped current collector by drying the coated electrode active material slurry;

a rolling part configured to roll the electrode mixture through a pair of rollers; and a roller-shaped rewinder configured to rewind electrode sheets having a structure in which an electrode mixture formed on the sheet-shaped current collector is rolled.

Meanwhile, according to another embodiment of the present disclosure, there is provided a method for manufacturing an electrode for a secondary battery including the steps of:

(a) heating a sheet-shaped current collector containing copper at a temperature of 120° C. to 150° C. for a time (M) satisfying the following Equation 1; and (b) coating, drying, and rolling an electrode active material slurry onto at least one surface of the heated sheet-shaped current collector.

$$\frac{6000}{D} - 38 \le M \le \frac{6000}{D} - 10 \qquad \text{[Equation 1]}$$

wherein, D is a heating temperature (° C.), and

M is a heating time (minutes).

The sheet-shaped current collector may be composed of copper (Cu), or may be a material in which the surface of copper is coated with carbon, or an alloy or laminate of copper and other metals.

The heating may be performed by a convection method through hot air in the atmosphere, a heating method using heat source, or both of these methods.

The sheet-shaped current collector may have a room-temperature tensile strength after heating which is reduced by within 5% compared to the room-temperature tensile strength before heating, and may have a room-temperature tensile strength before heating of 30 kgf/mm² to 45 kgf/mm².

The sheet-shaped current collector may have an elongation after heating which is increased by 15% to 60% compared to the elongation before heating, and may have a toughness after heating which is increased by 20% to 50% compared to the toughness before heating.

DETAILED DESCRIPTION OF THE EMBODIMENTS

Hereinafter, the present disclosure will be described in more detail.

According to one embodiment of the present disclosure, there is provided an apparatus for manufacturing an electrode for a secondary battery including:

a roller-shaped unwinder in which a sheet-shaped current collector containing copper is wound;

a transfer part for continuously transferring the sheet-shaped current collector;

a heating part for heating the sheet-shaped current collector transferred from the unwinder at a temperature of 120° C. to 150° C. for a time (M) satisfying the following Equation 1; and a coating part for coating an electrode active material slurry onto at least one surface of the heated sheet-shaped current collector.

$$\frac{6000}{D} - 38 \le M \le \frac{6000}{D} - 10 \qquad \text{[Equation 1]}$$

wherein, D is a heating temperature (° C.), and

M is a heating time (minutes).

Hereinafter, the electrode manufacturing apparatus of the present disclosure will be described in detail with reference to the accompanying figures so that those skilled in the art can easily implement the invention. However, the following figures are for illustrative purposes only, and the invention may be modified in various different ways within the scope of the present disclosure, and is not limited to the figures.

Figure 1:
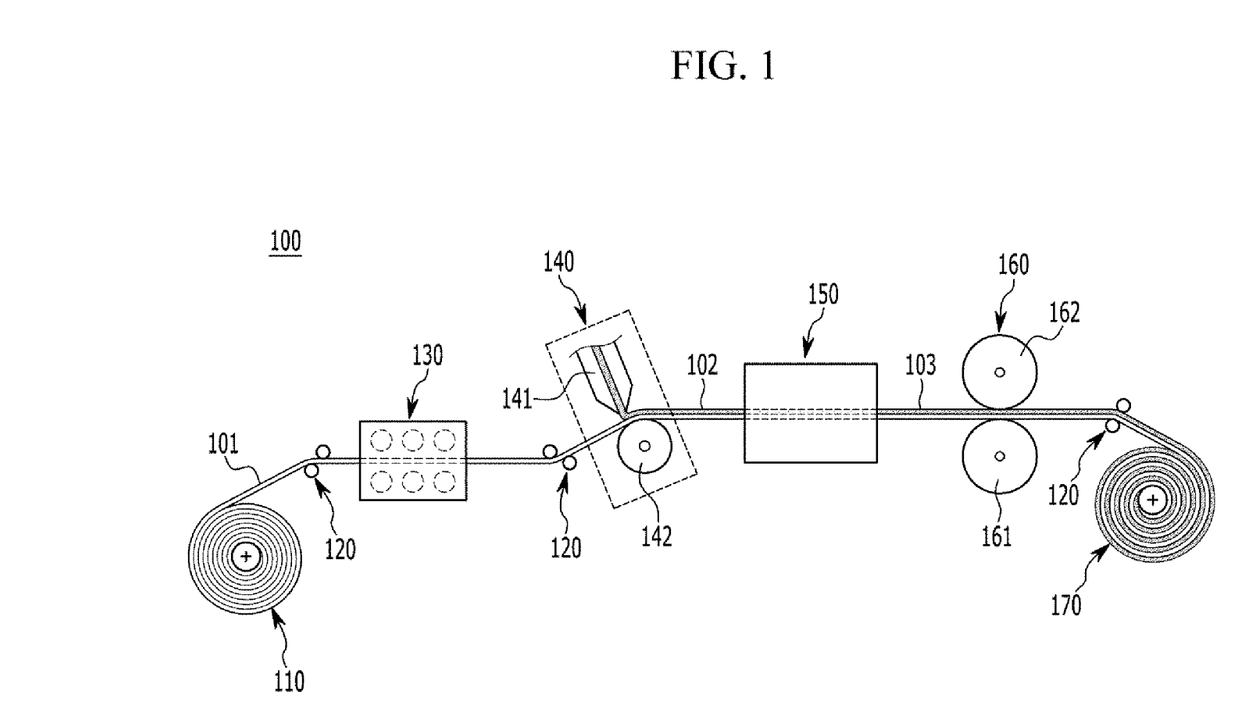
FIG. 1 is a schematic view of an apparatus for manufacturing an electrode for a secondary battery according to one embodiment of the present disclosure.

Specifically, FIG. 1 schematically shows such an electrode manufacturing apparatus.

Referring to FIG. 1, the electrode manufacturing apparatus according to the present disclosure includes:

a roller-shaped unwinder 110 in which a sheet-shaped current collector 101 containing copper is wound;

a transfer part 120 for continuously transferring the sheet-shaped current collector 101;

a heating part 130 for heating the sheet-shaped current collector 101 transferred from the unwinder 110 at a temperature of 120° C. to 150° C. for a time (M) satisfying the Equation 1; and a coating part 140 for coating an electrode active material slurry 202 onto at least one surface of the heated sheet-shaped current collector 101.

Hereinafter, the components of the electrode manufacturing apparatus will be described in detail.

First, the unwinder 110 has a structure in which the sheet-shaped current collector 101 is wound on a roll.

Such unwinder 110 unwinds the sheet-shaped current collector 101 so that the sheet-shaped current collector 101 is transferred by the transfer part 120.

Here, the sheet-shaped current collector 101 according to the present disclosure contains copper, and for example, may be composed of copper (Cu), or may be a material in which the surface of copper is coated with carbon, or an alloy or laminate of copper and other metals, and specifically may be composed of copper.

The transfer part 120 receives the sheet-shaped current collector 101 unwound from the unwinder 110 and serves to transfer the sheet-shaped current collector 101 to the heating part 130 and the coating part 140.

Here, the transfer part 120 may be a roll.

Next, the sheet-shaped current collector 101 unwound from the unwinder 110 and transferred by the transfer part 120 is transferred to the heating part 130.

The heating part 130 performs heating under a temperature and time that satisfies the above conditions.

Specifically, the heating temperature may be 120° C. to 150° C., specifically 125° C. to 150° C., and more specifically 130° C. to 150° C.

When the heating is performed at very low temperature outside the above range, it cannot reach the recrystallization temperature of the material forming the sheet-shaped current collector, but rather the elongation may be reduced, and the increase in toughness fails to increase to a satisfactory level. On the other hand, when the heating is performed at an excessively high temperature, oxidation of the sheet-shaped current collector may take place by the heating that may proceed in the atmosphere, which is not preferable.

Meanwhile, the heating may be performed for a time that satisfies the Equation 1.

Similar to the heating temperature, when the heating is performed for a too short time outside the above range, it cannot reach the recrystallization temperature of the material forming the sheet-shaped current, but rather the elongation may be reduced, and the increase in toughness fails to increase to a satisfactory level. On the other hand, when the heating is performed for an excessively long time, since oxidation of the sheet-shaped current collector may take place by the heating that may proceed in the atmosphere, which is not preferable.

However, the time is affected by the heating temperature, as shown in Equation 1. That is, it is more preferable that as the heating temperature increases, the heating time is shorter. For example, considering the heating temperature, at the highest temperature, even if the heating is performed for only 2 minutes, the effect intended by the invention can be obtained by a predetermined level, but it is preferable that the heating is not performed for 30 minutes or more, and at the lowest temperature, the heating has to be performed for at least 12 minutes, thereby obtaining the effect, and the heating can be performed up to 40 minutes.

Although the heating method of the heating part 130 is not limited, for example, the heating is possible by allowing the sheet-shaped current collector 101 to pass through a space such as a tube or box including a member for supplying a heat source and/or hot air, so that the heating may be performed by a convection method through hot air in the atmosphere, a heating method using heat source, or both of these methods.

According to these methods, the heating can be performed by a simple method in the manufacturing process of the electrode.

In addition, here, the heating time can be set by adjusting the transfer speed of the sheet-shaped current collector 101 to be transferred.

The sheet-shaped current collector 101 heated by the heating part 130 in this way is decreased in tensile strength by a predetermined level, but the toughness and elongation are greatly increased, thereby maximizing mechanical properties required for the sheet-shaped current collector 101.

Specifically, the sheet-shaped current collector 101 may have a room-temperature tensile strength after heating which is reduced by within 5%, specifically by within 3%, compared to the room-temperature tensile strength before heating.

When the tensile strength is too largely reduced outside the above range, the heating has more disadvantage than advantages, and thus setting of the heating condition is very important.

Further, the sheet-shaped current collector 101 may have a room-temperature tensile strength before heating of 30 $kgf/mm^2$ to 45 $kgf/mm^2$, specifically 30 $kgf/mm^2$ to 40 $kgf/mm^2$.

When the above range is satisfied, it can be used as a sheet-shaped current collector for manufacturing an electrode for a secondary battery, and when the mechanical strength becomes too weak outside the above range, it is not suitable for use as a support for electrode coating materials. The same can be applied to a sheet-shaped current collector having a mechanical strength higher than the above range, but since these materials are used for high strength implementation and other special purposes, in the present disclosure it is more suitable to a material having the mechanical properties of the sheet-shaped current collector that is most commonly and frequently used.

The tensile strength is measured according to the method prescribed in JIS C 6511 which is applied as a standard method for evaluating mechanical properties in the copper foil industry. In detail, using a universal testing machine (U.T.M) (Zwick Roell, Z2.5 TN, Germany), a specimen is pulled under crosshead speed of 50 mm/min at room temperature, and then the load is measured at the point of time when the specimen is broken. The tensile strength is calculated as follows:

$$\text{Tensile strength (kgf/mm}^2\text{)=Load value (kgf)/Thickness (mm)} \times \text{Width (mm)}$$

On the other hand, the sheet-shaped current collector 101 may have an elongation after heating which is increased by 15% to 60%, specifically by 30% to 50%, compared to the elongation ratio before heating.

If heating is performed to have a very small increase width of the elongation outside the above range, a desired degree of the increase width of the toughness cannot be obtained, and thus, it is difficult to achieve the effect intended by the invention. When heating is performed under the conditions of high temperature and long time in order to excessively increase the increase width in elongation, the external load that the material itself can withstand is reduced by a strength-elongation trade-off, and when exposed to a high load instantaneously, the material cannot be stretched but may be destroyed, which is not preferable.

Similarly, the sheet-shaped current collector 101 may have a toughness after heating which is increased by 20% to 50%, specifically by 30% to 50%, compared to the toughness before heating.

The toughness is a value calculated by a combination of strength-elongation, and the direction that enhances only any one of strength and elongation is not appropriate, and when minimizing the decrease in strength and maximizing elongation, in compliance with the presented temperature and time conditions, the values as above can be obtained.

The elongation is measured according to the method prescribed in JIS C 6511. In detail, using a universal testing machine (U.T.M) (Zwick Roell, Z2.5 TN, Germany), a specimen is pulled under crosshead speed of 50 mm/min at room temperature, and then the deformed length is measured at the point of time when the specimen is broken. The elongation is calculated as follows. The gauge distance is the distance between grippers holding the specimen, and is measured based on 50 mm.

Elongation (%)=Deformed length/Gage distance×100

Toughness (kgf·mm) is the area under the tensile strength-elongation graph until the specimen is broken according to the method for measuring the tensile strength and elongation, and is calculated by the following calculation formula.

$$\text{Toughness} = \int_0^{\epsilon_f} \sigma d\epsilon$$

In the above formula, σ is a tensile strength, ε is an elongation, and εf is an elongation at the breaking time of a material.

The heating of the current collector before coating the electrode active material slurry as described above is different from the heating for self-annealing and the heating for acceleration evaluation, which the copper foil manufacturer performs in order to stabilize the foil phase because the foil phase is unstable. That is, the heating is additionally performed before coating the electrode active material slurry onto the current collector provided by the above manufacture after being stabilized by the heating.

The sheet-shaped current collector 101 having improved mechanical properties by being heated in this way is transferred to the coating part 140 again by a transfer part 120.

The coating part 140 coats the electrode active material slurry 102 onto the sheet-shaped current collector 101.

In this case, the coating part 140 is not limited as long as it is in a form capable of coating the electrode active material slurry 102, and it can be coated by a conventionally known coating device such as a coating die, a coating roll, or a slide-slot, but FIG. 1 shows, as an example, a structure in which an electrode active material slurry 102 is coated through a coating die.

Specifically, the coating part 140 may have a structure including: a coating die 141 provided with an outlet slot so that the electrode active material slurry 102 flows outside toward the sheet-shaped current collector 101, and a coater roll 142 which is arranged separately from the outlet slot of the coating die 141 at a predetermined interval, and transfers the sheet-shaped current collector 101 by rotation, so that the electrode active material slurry 102 can be coated onto the sheet-shaped current collector 101 by the coating die 141.

Meanwhile, referring back to FIG. 1, the apparatus 100 for manufacturing the electrode for a secondary battery according to the present disclosure further includes:

a drying part 150 configured to form an electrode mixture on at least one surface of a sheet-shaped current collector 101 by drying the coated electrode active material slurry;

a rolling part 160 configured to roll the electrode mixture 103 through a pair of rollers 161 and 162; and a roller-shaped rewinder 170 configured to rewind electrode sheets having a structure in which an electrode mixture 103 formed on the sheet-shaped current collector 101 is rolled.

The drying part 150 is not limited as long as it is a device capable of forming the electrode mixture 103 by evaporating a solvent from the electrode active material slurry 102, and may have any conventionally known structure, and for example, the drying may be performed by a heating system, and/or a hot air system.

When passing through such a drying part 150, an electrode mixture 103 in which a solvent is evaporated is formed on the sheet-shaped current collector 101, and the electrode mixture 103 is rolled through the rolling part 160 so as to have an appropriate porosity and an electrode density.

As long as the rolling part 160 is in a form capable of rolling the electrode mixture 103, the device and structure, etc. are not limited, but for example, may be in the form of rolling by adjusting the separation distance between a pair of rollers 161 and 162.

Finally, the electrode sheet having a structure in which the electrode mixture 103 formed on the sheet-shaped current collector 101 is rolled is transferred by the transfer part 120 and wound on a roller-shaped rewinder 170.

The rewinder 170 has a structure in which the electrode sheet is wound on a roll, similarly to the unwinder 110.

Meanwhile, according to another embodiment of the present disclosure, there is provided a method for manufacturing an electrode for a secondary battery including the steps of:

(a) heating a sheet-shaped current collector containing copper at a temperature of 120° C. to 150° C. for a time (M) satisfying the following Equation 1; and (b) coating, drying, and rolling an electrode active material slurry onto at least one surface of the heated sheet-shaped current collector.

$$\frac{6000}{D} - 38 \leq M \leq \frac{6000}{D} - 10 \qquad \text{[Equation 1]}$$

wherein, D is a heating temperature (° C.), and

M is a heating time (minutes).

The sheet-shaped current collector of step (a) may be composed, specifically, of copper (Cu), or may be a material in which the surface of copper is coated with carbon, or an alloy or laminate of copper and other metals, as described above.

Further, the heating may be performed by a convection method through hot air in the atmosphere, a heating method using heat source, or both of these methods, as described above.

And, by such a heating, the sheet-shaped current collector can have a tensile strength after heating which is reduced by within 5%, specifically by within 3%, compared to the tensile strength before heating, and can have a tensile strength before heating of 30 kgf/mm² to 45 kgf/mm², specifically 30 kgf/mm² to 40 kgf/mm².

Moreover, by the heating of step (a), the sheet-shaped current collector may have an elongation after heating which is increased by 15% to 60%, specifically to 30% to 50%, compared to the elongation before heating, and can have a toughness after heating which is increased by 20% to 50%, specifically by 30% to 50%, compared to the toughness before heating, The coating, drying, and rolling of the electrode active material slurry of the step (b) performed subsequently are the same as described above.

Meanwhile, the electrode active material slurry includes an active material as described below.

The type of the active material is determined depending on whether the electrode is a positive electrode or a negative electrode.

For example, when the electrode is a positive electrode, the active material is not limited, and examples thereof may include $LiCoO_2$, $LiNiO_2$, $LiMnO_2$, $LiMn_2O_2$, $Li(Ni_a Co_b Mn_c)O_2$ ($0<a<1$, $0<b<1$, $0<c<1$, $a+b+c=1$), $LiNi_{1-d} Co_d O_2$, $LiCo_{1-d} Mn_d O_2$, $LiNi_{1-d}Mn_d O_2 (0 \leq d<1)$, $Li(Ni_a Co_b Mn_c)O_4$ ($0<a<2$, $0<b<2$, $0<c<2$, $a+b+c=2$), $LiMn_{2-e} Ni_e O_4$, $LiMn_{2-e} Co_e O_4$ ($0<e<2$), $LiCoPO_4$, $LiFePO_4$ or the like, and any one alone or a mixture of two or more of them may be used.

When the electrode is a negative electrode, the active material may include carbonaceous materials such as artificial graphite, natural graphite, graphitized carbon fibers and amorphous carbon; metallic compounds capable of alloying with lithium, such as Si, Al, Sn, Pb, Zn, Bi, In, Mg, Ga, Cd, Si alloy, Sn alloy or Al alloy; metal oxides capable of doping and undoping lithium, such as $SiO_x$ ($0<x<2$), $SnO_2$, vanadium oxide and lithium vanadium oxide; or a composite including the above metallic compound and the carbonaceous material such as a Si—C composite or a Sn—C composite, or the like, and any one alone or a mixture of two or more of them may be used. In addition, a metal lithium thin film may be used as the negative electrode active material. Further, both low crystalline carbon and high crystalline carbon may be used as the carbon material. Typical examples of the low crystalline carbon may be soft carbon and hard carbon. Typical examples of the high crystalline carbon may be amorphous, planar, flaky, spherical or fibrous natural or artificial graphite, Kish graphite, pyrolytic carbon, mesophase pitch based carbon fiber, mesocarbon microbeads, mesophase pitches, and high-temperature calcined carbon such as petroleum or coal tar pitch derived cokes.

In addition, the electrode active material slurry may further include a conductive material and a binder, and optionally, a filler.

The conductive material is used to impart conductivity to the electrode, and in the battery to be configured, the conductive material can be used without particular limitation as long as it does not cause chemical changes and has electronic conductivity. Specific examples include carbon-based materials such as carbon black, acetylene black, ketjen black, channel black, furnace black, lamp black, thermal black and carbon fiber; graphite such as natural graphite and artificial graphite; metal powder or metal fibers such as copper, nickel, aluminum and silver; conductive whiskey such as zinc oxide and potassium titanate; conductive metal oxides such as titanium oxide; or a conductive polymer such as a polyphenylene derivative, or carbon nanotube, and any one alone or a mixture of two or more of them may be used. In particular, it is preferable to use carbon nanotube, which is because the material has good conductivity, thereby being able to minimize the content of the conductive material. The conductive material may be contained in an amount of 0.5 to 10% by weight, specifically 1 to 5% by weight, based on the total weight of the respective electrode mixtures.

The binder plays a role of improving adhesion between the positive electrode active material particles and adhesive strength between the positive electrode active material and the current collector. Specific examples include polyvinylidene fluoride (PVDF), vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, ethylene-propylene-diene polymer (EPDM), sulfonated-EPDM, styrene butadiene rubber (SBR), fluoro-rubber, or various copolymers thereof, and any one alone or a mixture of two or more of them may be used. The binder may be contained in an amount of 0.5 to 10% by weight, specifically 1 to 5% by weight, based on the total weight of the respective electrode mixtures.

The filler is optionally used as a component for inhibiting the expansion of the positive electrode. The filler is not particularly limited so long as it is a fibrous material that does not cause chemical changes in the corresponding secondary battery. Examples of the filler include olefin-based polymers such as polyethylene and polypropylene; and fibrous materials such as glass fiber and carbon fiber. The filler may be contained in an amount of 1 to 3% by weight based on the total weight of the respective electrode mixtures.

However, since the sheet-shaped current collector contains copper, the electrode according to the present disclosure may be, specifically, a negative electrode in which copper is generally used as a current collector.

The process of coating, drying, and rolling the electrode active material slurry onto the sheet-shaped current collector is the same as described above, and the transfer rate of the sheet-shaped current collector is also the same as described above.

Hereinafter, various examples of the present disclosure will be described in detail so that those skilled in the art can easily implement them. The present disclosure may be modified in various different ways, and is not limited to the examples set forth herein.

Experimental Example 1

Figure 2:
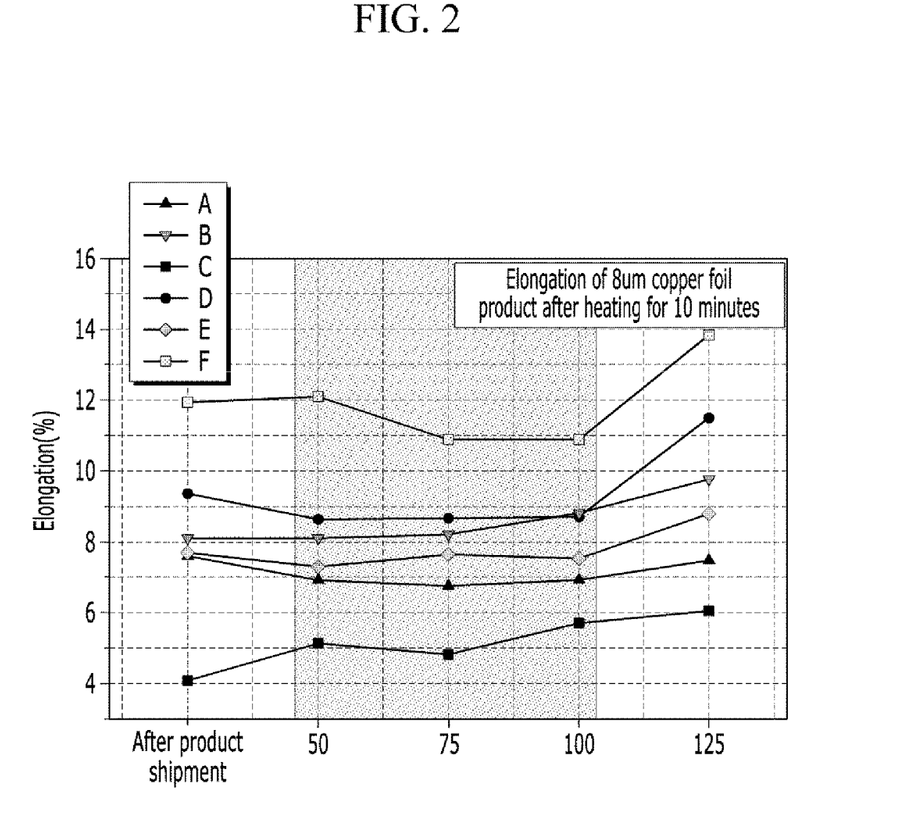
FIG. 2 is a graph illustrating the changes in elongation according to Experimental Example 1.

Copper current collectors A to F having a thickness of 8 µm produced by different manufacturers were prepared, heated at 50° C., 75° C., 100° C. and 125° C. for 10 minutes, respectively, and then the elongation thereof was measured, and shown in FIG. 2.

The elongation was measured according to the method prescribed in JIS C 6511. In detail, using a universal testing machine (U.T.M) (Zwick Roell, Z2.5 TN, Germany), a specimen was pulled under a crosshead speed of 50 mm/min at room temperature, and then the deformed length was measured at the point of time when the specimen was broken. The elongation was calculated as follows. The gauge distance is the distance between grippers holding the specimen, and was measured based on 50 mm.

$$\text{Elongation (\%) = Deformed length / Gage distance} \times 100$$

Referring to FIG. 2 below, when performing heating at 50° C. to 100° C., it can be confirmed that the change in elongation differs depending on the product, and the copper current collectors produced by some manufacturers shows the tendency of decreasing the elongation relative to room temperature after heating (copper current collectors A, D, E, F). On the other hand, when raising the heating temperature to about 125° C., exceeding 100° C., it can be seen that the elongation is similar or improved by a predetermined level compared to the elongation of the copper current collector before heating.

From this, it can be expected that a heating temperature of at least 120° C. or more is required to obtain the effect of increasing the elongation of the copper current collector provided regardless of the manufacturer.

Preparation Example

A copper current collector having a thickness of 8 µm produced by an electroplated method commonly used as a negative electrode current collector for a battery was prepared.

Examples 1 to 5, Comparative Examples 1 to 14

The copper current collector of Preparation Example was heated at the heating temperature and heating time as shown in Table 1 below.

TABLE 1

| Heating | Room temperature (heating X) | 50° C. | 75° C. | 100° C. | 125° C. | 150° C. | 175° C. |
|---|---|---|---|---|---|---|---|
| 2 min 30 sec | Comparative Example 1 | Comparative Example 2 | Comparative Example 5 | Comparative Example 8 | Comparative Example 11 | Example 3 | Comparative Example 12 |
| 10 min | | Comparative Example 3 | Comparative Example 6 | Comparative Example 9 | Example 1 | Example 4 | Comparative Example 13 |
| 30 min | | Comparative Example 4 | Comparative Example 7 | Comparative Example 10 | Example 2 | Example 5 | Comparative Example 14 |

Experimental Example 2

The tensile strength and the elongation of the copper current collectors heated as in Examples 1 to 5 and Comparative Examples 1 to 14 were measured, respectively, and shown in FIG. 3 below, and the toughness was measured and shown in Table 2 below.

The tensile strength was measured according to the method prescribed in JIS C 6511 which was applied as a standard method for evaluating mechanical properties in the copper foil industry. In detail, using a universal testing machine (U.T.M) (Zwick Roell, Z2.5 TN, Germany), a specimen was pulled under crosshead speed of 50 mm/min at room temperature, and then the load was measured at the point of time when the specimen was broken. The tensile strength was calculated as follows:

Tensile strength (kgf/mm$^2$) =

Load value (kgf)/Thickness (mm) × Width (mm)

The elongation was measured according to the method prescribed in JIS C 6511. In detail, using a universal testing machine (U.T.M) (Zwick Roell, Z2.5 TN, Germany), a specimen was pulled under a crosshead speed of 50 mm/min at room temperature, and then the deformed length was measured at the point of time when the specimen was broken. The elongation was calculated as follows. The gauge distance is the distance between grippers holding the specimen, and was measured based on 50 mm.

Elongation (%)=Deformed length/Gage distance×100

Toughness (kgf·ᴏmm) is the area under the tensile strength-elongation graph until the specimen is broken according to the method for measuring the tensile strength and elongation, and is calculated by the following formula.

$$\text{Toughness} = \int_0^{\varepsilon_f} \sigma d\varepsilon$$

In the above formula, σ is a tensile strength, ε is an elongation, and $\varepsilon_f$ is an elongation at the breaking time of a material.

TABLE 2

| Toughness (kgf·ᴏmm) | Room temperature (heating X) | 50° C. | 75° C. | 100° C. | 125° C. | 150° C. | 175° C. |
|---|---|---|---|---|---|---|---|
| 2 min 30 sec | 14.56 | 15.89 | 16.11 | 15.44 | 15.86 | 20.11 | 20.53 |
| 10 min | | 15.68 | 15.59 | 15.67 | 18.13 | 19.80 | 21.07 |
| 30 min | | 15.59 | 15.16 | 15.53 | 20.13 | 21.21 | 21.07 |

Figure 3:
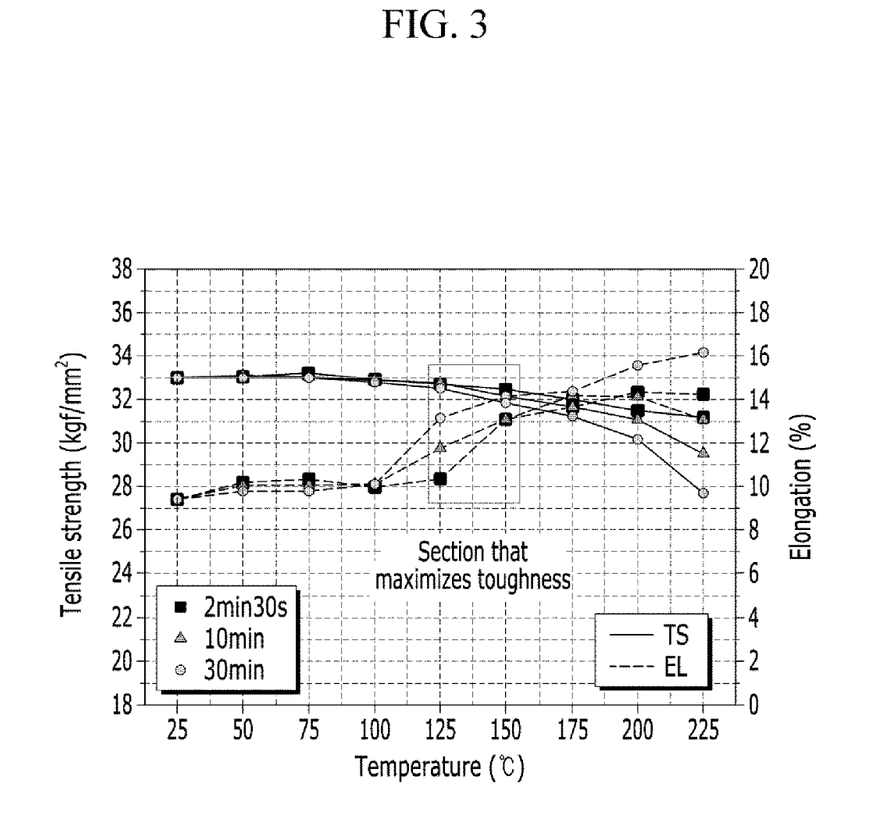
FIG. 3 is a graph illustrating the changes in tensile strength and elongation according to Experimental Example 2.

Referring to FIGS. 3 to Table 2 below, it can be seen that the tensile strength and elongation changes according to the heating, and the toughness also changes accordingly.

At this time, in order to achieve the effect intended by the invention, the section in which depending on the heating temperature and time, the reduction rate of tensile strength is minimized and the elongation and toughness is maximized occurs. When it deviates from the above, it can be confirmed that the tensile strength decreases rapidly, or the increase in elongation is slight or decreases, which is not preferable.

More specifically, when the temperature range of the heating does not satisfy the temperature range disclosed herein and is too low, it is not possible to obtain an increase in elongation equivalent to that. The rate of increase in elongation is very small within 3%. Therefore, the present disclosure cannot obtain a desired degree of effect through the heating, and thus, it is inefficient to perform the process.

On the other hand, when the temperature range is too high, it can be confirmed that the elongation and toughness increase by a predetermined level, but the increase width is not large, while the tensile strength decreases rapidly. Rather, its tensile strength becomes too weak for use as a current collector.

On the other hand, even in the case where the temperature range is satisfied, if the condition of the heating time of the present disclosure is not satisfied (Comparative Example 11), the increase in elongation is not improved to the extent desired by the invention, but increases as small as 3%, so that the increase in toughness is not large, and thus, the effect of performing the heating step is slight and inefficient.

On the other hand, if the heating temperature and heating time of the present disclosure are satisfied, it can be confirmed that the rate of decrease in tensile strength is as small as less than 5%, and also the elongation and toughness increase rapidly.

In this case, it is possible to prevent a disconnection problem that occurs in the roll-to-roll process during the electrode manufacturing process using the current collector. Also, since the copper current collector is applied to the process after being exposed to the recrystallization temperature or higher by heating, it is possible to prevent, in advance, unpredictable mechanical behavior, such as a decrease in elongation that occurs before the recrystallization section when an electrode was previously exposed to heat by a subsequent process.

With a similar context, it is also expected that a stabilized effect of the internal microstructure of the material can be obtained additionally compared to the shipped state.

INDUSTRIAL APPLICABILITY

In the apparatus and method for manufacturing an electrode for a secondary battery according to the present disclosure, before the electrode active material slurry is coated onto the sheet-shaped current collector, the sheet-shaped current collector is heated under a specific condition, so that the decrease in tensile strength of the sheet-shaped current collector is minimized while maximizing toughness and elongation. Thus, regardless of the difference in mechanical properties by manufactures of sheet-shaped current collectors, it has the effect of ensuring high toughness and enabling process input.

In addition, in the case of using such a sheet-shaped current collector, since it is put into the secondary battery electrode manufacturing process in a state in which toughness and elongation are maximized, it is possible to prevent the disconnection problem that occurs during the roll-to-roll process.

Moreover, since the heating is performed at a temperature equal to or higher than the recrystallization temperature of the sheet-shaped current collector containing copper, it can prevent the material properties of the sheet-type current collector from rapidly changing due to thermal shock caused by the subsequent process, and the disconnection that occurs in the charge/discharge process can be improved.

The invention claimed is:

1. An apparatus for manufacturing an electrode for a secondary battery comprising:
   a roller-shaped unwinder in which a sheet-shaped current collector containing copper is wound;
   a transfer part configured for continuously transferring the sheet-shaped current collector;
   a heating part configured for heating the sheet-shaped current collector transferred from the unwinder at a temperature of 120° C. to 150° C. for a time (M) satisfying the following Equation 1; and
   a coating part, disposed after the heating part in a moving direction of the sheet-shaped current collector, configured for coating an electrode active material slurry onto at least one surface of the heated sheet-shaped current collector, and
   a drying part configured to form an electrode mixture on the at least one surface of the sheet-shaped current collector by drying the coated electrode active material slurry;

$$\frac{6000}{D} - 38 \leq M \leq \frac{6000}{D} - 10 \quad \text{[Equation 1]}$$

wherein, D is a heating temperature (° C.), and
M is a heating time (minutes)
wherein the coating part is a coating die, a coating roll, or a slide-slot.

2. The apparatus for manufacturing the electrode according to claim 1,
   wherein the sheet-shaped current collector is composed of copper (Cu), or is a material in which a surface of copper is coated with carbon, or an alloy or laminate of copper and other metals.

3. The apparatus for manufacturing the electrode according to claim 1,
   wherein the heating part is adapted to perform heating by a convection method through hot air in an atmosphere, a heating method using heat source, or both of these methods.

4. The apparatus for manufacturing the electrode according to claim 1,
   wherein the sheet-shaped current collector has a room-temperature tensile strength after heating which is reduced by within 5% compared to a room-temperature tensile strength before heating.

5. The apparatus for manufacturing the electrode according to claim 4,
   wherein the sheet-shaped current collector has the room-temperature tensile strength before heating of 30 kgf/mm$^2$ to 45 kgf/mm$^2$.

6. The apparatus for manufacturing the electrode according to claim 1,
   wherein the sheet-shaped current collector has an elongation after heating which is increased by 15% to 60% compared to an elongation before heating.

7. The apparatus for manufacturing the electrode according to claim 1,
   wherein the sheet-shaped current collector has a toughness after heating which is increased by 20% to 50% compared to a toughness before heating.

8. The apparatus for manufacturing the electrode according to claim 1,
   wherein the electrode manufacturing apparatus further comprises:
   a rolling part configured to roll the electrode mixture through a pair of rollers; and
   a roller-shaped rewinder configured to rewind electrode sheets having a structure in which an electrode mixture formed on the sheet-shaped current collector is rolled.

9. An apparatus for manufacturing an electrode for a secondary battery comprising:
   a roller-shaped unwinder in which a sheet-shaped current collector containing copper is wound;
   a transfer part configured for continuously transferring the sheet-shaped current collector;
   a heating part configured for heating the sheet-shaped current collector transferred from the unwinder at a temperature of 120° C. to 150° C.;
   a coating part, disposed after the heating part in a moving direction of the sheet-shaped current collector, configured for coating an electrode active material slurry onto at least one surface of the heated sheet-shaped current collector; and
   a drying part configured to form an electrode mixture on the at least one surface of the sheet-shaped current collector by drying the coated electrode active material slurry;
   wherein the apparatus is configured to heat the sheet-shaped current collector in an un-coated state; and
   wherein no coating part precedes any heating part in the moving direction of the sheet-shaped current collector.

* * * * *